March 4, 1947.  R. H. DOBBS  2,416,796
HYDRAULIC JACK
Filed May 7, 1945  2 Sheets-Sheet 1
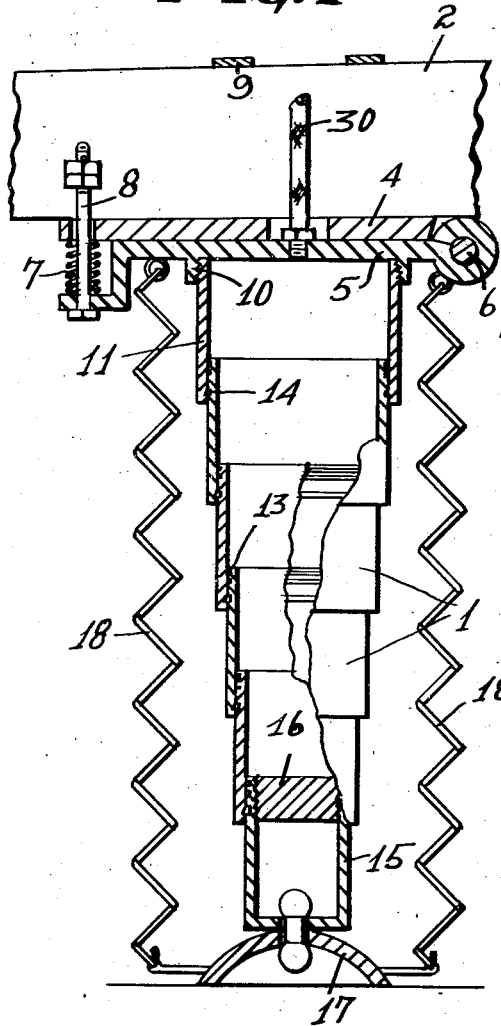
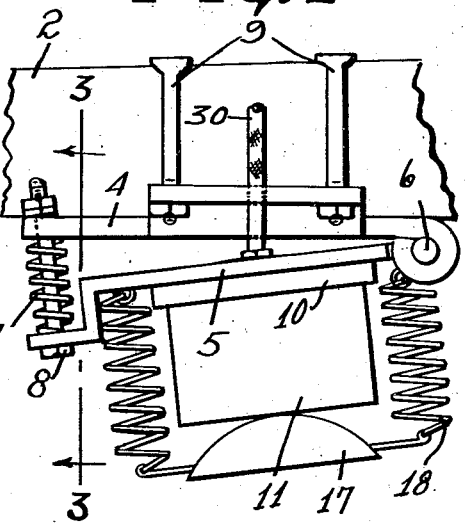
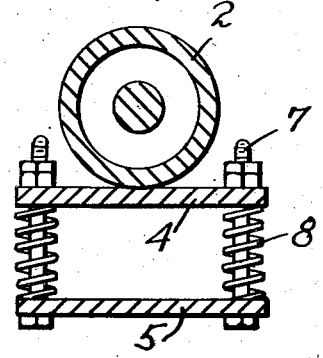
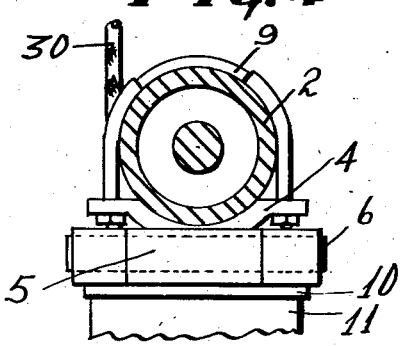
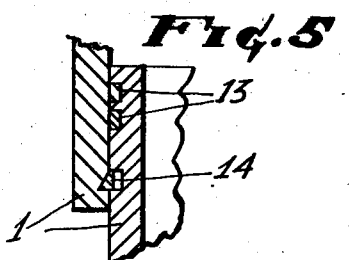
INVENTOR.
R. H. DOBBS.

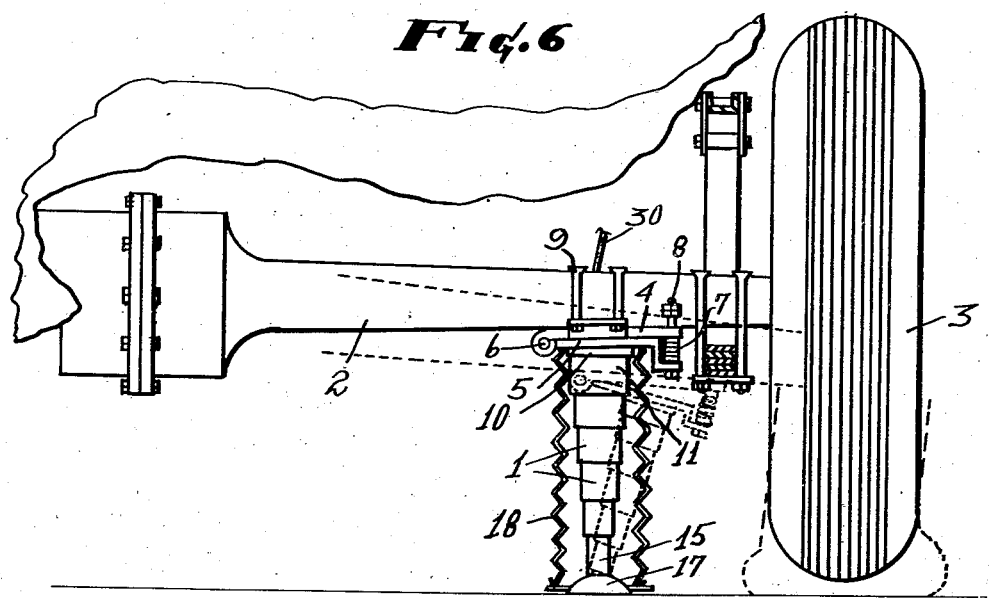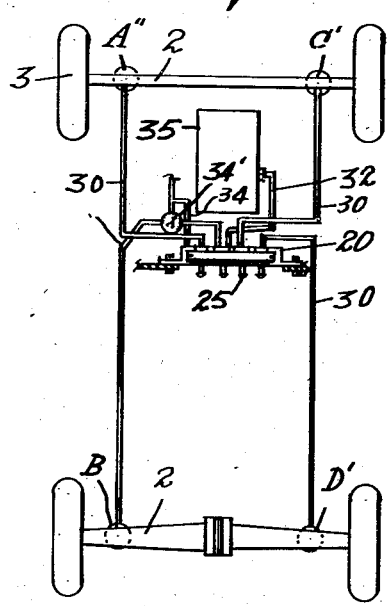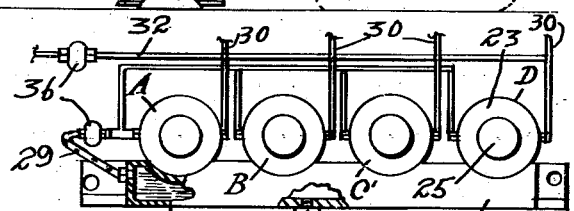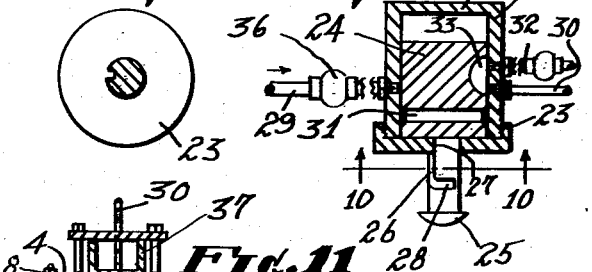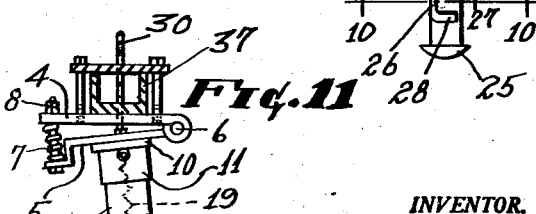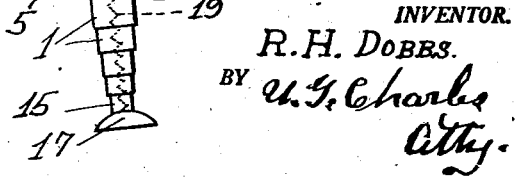

Patented Mar. 4, 1947

2,416,796

UNITED STATES PATENT OFFICE 2,416,796

HYDRAULIC JACK

Richard H. Dobbs, Atlanta, Kans.

Application May 7, 1945, Serial No. 592,459

2 Claims. (Cl. 254—86)

This invention relates to a hydraulic jack, and has for its principal object the application of jacks to raise the wheels of a motor vehicle when one or more of its wheel tires become deflated, and means to hydraulically actuate the jacks, selectively.

A further object of this invention is to secure a jack permanently to the axle adjacent each wheel to raise the same independently of the others, or to raise the wheels in pairs if so desired.

A still further object is to provide an efficient means to retract the jack compactly to its normally disengaged position as carried by the axle of the vehicle for future use.

These and other objects will hereinafter be more fully explained, reference being had to the accompanying drawings forming a part of this specification and in which like characters will apply to like parts in the different views.

Referring to the drawings:

Fig. 1 is a sectional elevation of the jack engaged as hoisting means for an axle of a motor vehicle to show the hinge closed by rocking movement of the axle on its path upward.

Fig. 2 is a view of the jack collapsed and arranged to contact the gound at an angle from a vertical plane to position the axis of the jack at right angles to an axle when the same is raised.

Fig. 3 is a sectional view taken on line 3—3 in Fig. 2 illustrating a pair of springs to open the hinge.

Fig. 4 is a cross section of the axle looking toward the pivot connection of the hinge to show the U-bolts that secure the jack to the axle, the retracting spring being removed.

Fig. 5 is an enlarged fragmentary view to show the stop for the extreme outward movement of the jacks telescopic joints, also the oiltight rings.

Fig. 6 is an elevation of the jack opposite to that shown in Fig. 1, in its service raising a wheel and its end of an axle from a slanting position as shown by dotted lines whereby the hinge is closed for a solid uniform bed while carrying the wheel and axle.

Fig. 7 is a diagrammatical plane view to show the pipe lines as positioned in working relation to the instrument board, wheels and engine.

Fig. 8 is a front view of the oil valve controls and oil tanks.

Fig. 9 is a sectional view through one of the valves.

Fig. 10 is a sectional view taken on line 10—10 of Fig. 9.

Fig. 11 is a modification for the jack when mounted on the longitudinal frame member of the vehicle, also showing a retracting spring internally applied.

As a more concise description of the drawings for this invention, it will be seen that the jack heretofore mentioned consists of a plurality of tubular members 1 arranged to telescopically engage, said members, each being reduced in length sufficient so that in their collapsed position as shown in Fig. 2, the jack as a whole will be positioned above the road bed for ample clearance during transit of the vehicle.

The jack as shown is carried by a vehicle axle 2 adjacent its wheels 3 and has a hinge consisting of upper and lower leaves 4 and 5, respectively, that are rockably connected by a pin 6 at one of their corresponding ends, the other end of the lower leaf being tensioned from its upper leaf by a coil spring 7, said lower leaf being limited in its downward rock by a bolt 8 extending through the spring. The hinge, being so arranged as above described, will slant the shaft of the jack from a vertical plane to substantially meet the slant attained by the wheels of the vehicle when one of its tires is collapsed as shown by dotted lines in Fig. 6, and when the axle is raised to a horizontal plane, the hinge is closed to carry the weight of the vehicle while the wheel and its tire is removed for repair or the like, after which the jack is collapsed to its disengaged position as shown in Fig. 2.

It will be seen that the upper leaf 4 of the hinge is secured to the axle by U-bolts 9 while the lower leaf 5 is a medium to rockably carry the jack. Said lower leaf on its under side has an annular flange 10 in which the upper end of the top section 11 of the shaft is seated and secured oil-tight as an upper head for the shaft, the other sections 1 being formed in like manner to that of the said top sections except being equipped with rings 13 for oil-tight telescopic engagement of the sections. There is also provided an annular stop ring 14 spaced inwardly from the first said rings, and adapted to engage in an annular groove positioned in the inner wall of an adjacent section a spaced distance upward from its lower end, said groove having a right angle shoulder and an upwardly and inwardly slanting wall to release the said ring for collapse of the sections telescopically while the right angle shoulder will function as a stop for an extreme expansion of said sections.

It will be seen that a section 15 at the lower extremity of the jack has a head 16 threadedly engaged in the upper end thereof oil-tight to function as a head for the lower end of the shaft, while the lower end of said section has a rockably mounted concavo-convex foot 17 to seat on the road bed, floor, or the like to carry the load imposed on the jack. It will be understood that the jack is hydraulically operated as later described, however when the pressure is released the shaft members are free to collapse to a position shown in Fig. 2, the action of which is through the medium of springs 18. The ends of the springs are connected to the foot member and lower leaf of the hinge and if modified as shown in Fig. 11 a single spring 19 may be applied axially in the shaft as shown by dotted lines. The hydraulic actuating power for the jack is provided through the medium of the oiling system pump of the vehicle, said system not being shown in the drawings, the oil being conducted through pipes, later described, connecting the jacks separately to an oil compression chamber 20, said pipe lines having valves to control the oil pressure for the jacks. Said valves, each consists of a cylindrical shell 21 having a head 22 integrally joined to close one end, the other end of said shell being closed by an axially apertured head 23 threadedly engaging thereon. Slidably positioned in the shell is a core 24, said core having axially secured thereto a pulling headed stem 25, that outwardly extends through the apertured head for reciprocal movement of the core to energize and disengage its respective jack. It will be seen that the stem has a bayonet groove 26 in its side to be engaged by a lug 27 extending inward of the aperture whereby when the core is moved inward to its extremity the same may be locked by turning the core so that the lug will enter the grooves offset 28 at which instant the jack is engaged as pipes 29 and 30 will communicate through an annular groove 31 that surrounds the core. To disengage the jack, said headed stem 25 is drawn outward as shown in Fig. 9, in which instance, the force of oil pressure is cut off by the core as it closes pipe 29, in which case, pipe line 30 will communicate with pipe line 32 through the medium of a depression 33 in the side of said core and with which last said pipe communicates, and so on for the operation of the other valves and their respective jacks. It will be understood that pipe lines 30 extend to and are connected to the upper extremity of their respective jacks, consequently, said pipe lines 30 will function as a feed and exhaust for the oil to energize and disengage the jacks, respectively. To clarify each jack control, the valves and their respective jacks will be referred to by corresponding alphabetic letters as follows: valve A will control jack A'' as shown in Fig. 7, valve B will control jack B, valve C' will control jack C' and valve D will control jack D'. The line 29 communicates with the compression chamber 20 which is charged with oil from the oil pump of the vehicle through a line 34 that leads to the pressure guage 34' to indicate the pressure of the pump output. It will be understood that the pump is not shown. However, all engines are equipped with such to lubricate their working parts. Pipe line 32 leads to the crank case 35 which is tapped to receive the end of line 32 functioning as a return for oil from the jack as the same is being retracted. It will be also noted that check valves 36 are positioned at various positions in the lines to avoid backward flow of oil when the jack is idle.

The operation of the invention is as follows. It will be understood that the valve controls are positioned at a convenient place for the operator of the vehicle, and, for example, it will be assumed that the tire on the right rear wheel becomes deflated, which tire must be removed for repair. To accomplish such, the jack that is carried by the axle adjacent the tire will be energized and labeled as D', consequently valve D will be pushed inward, which in turn, will bring pipe 30 in communication with the oil pressure pipe 29 through the medium of the core 24 of the valve to supply hydraulic fluid to the jack to energize the same, which will raise the axle adjacent the wheel and be so maintained for the required repair or change of the tire. When the tire has been changed, valve D is drawn forward, permitting the jack to drain its hydraulic fluid to the crankcase 35 through another pipe line 32 arranged therefor, and as a result, the jack springs 18 will retract its sections to a folded position in close proximity to the axle as well as eject the oil as the jack closes to its collapsed position, said jack being so retained for like operation in the future. The remaining jacks are operated in the same manner as the one just described, and each being equipped with its respective pipe 30 and valve to control the hydraulic fluid therethrough.

Fig. 11 shows a modified arrangement for mounting the jack which is accomplished by securing the same to the longitudinal frame member 37 of the vehicle adjacent each wheel, and also in said figure is shown by dotted lines a spring 19 to retract the jack members.

While I have described the jack as being operated by the oil pump system equipped with the vehicle, I do not wish to be restricted to such alone as a separate pump may be mounted in close relation to the fan belts of the engine, or the pump may be operated by an electric motor, and such other modifications may be made as lie within the scope of the appended claims.

Having fully described my invention what I claim as new and desire to secure by Letters Patent is:

1. In a hydraulic jack of the class described comprising in combination with a motor vehicle, a hollow shaft comprised of upper, lower and intermediate sections telescopically engaging and having rings for oil tight purposes, the upper and intermediate sections each having an annular ratchet groove internally applied and being spaced upwardly from their lower ends, and an annular pawl to engage in said groove to function as a detent against separation of the sections at their extremity of expansion with respect to each other when the jack is in action, said pawl and a groove therefor being externally applied to the section a spaced distance downward from their upper ends, a head to close the upper end of the lower section and a foot rockably connected to the other end as a support for the jack, a leaf hinge to rockably carry the jack, means to secure one leaf of said hinge to an axle of the motor vehicle, the other leaf being secured to the upper end of the upper section as a closing head therefor and as carrying means for the jack, a pipe line to connect the jack with the motor vehicle pressure oiling system and valves in the pipe line to control the oil pressure and direction of its circulation to energize and de-energize the jack.

2. In a hydraulic jack of the class described and as recited in claim 1, coil springs having one of their ends secured to the foot of the jack and their other ends being secured to the hinge as collapsing means for the telescopically engaged sections when compression is released, and other coil springs secured between the free ends of the hinge to rock the same from each other while the sections are collapsed.

RICHARD H. DOBBS.

REFERENCES CITED

The following references are of record in the file of this patent:

UNITED STATES PATENTS

| Number | Name | Date |
|---|---|---|
| 2,168,906 | Leary | Aug. 8, 1939 |
| 2,237,167 | Skavinsky | Apr. 1, 1941 |
| 2,343,937 | Smith | Mar. 14, 1944 |